May 28, 1963 G. W. COPE 3,091,192
SIDE FRAME
Filed May 20, 1960 2 Sheets-Sheet 1

Inventor:
Geoffrey W. Cope
By Wilmer Mecklin
his Attorney

May 28, 1963 G. W. COPE 3,091,192
SIDE FRAME
Filed May 20, 1960 2 Sheets-Sheet 2

Inventor:
Geoffrey W. Cope
By Wilmer Mechlin
his Attorney

United States Patent Office 3,091,192
Patented May 28, 1963

3,091,192
SIDE FRAME
Geoffrey W. Cope, Williamsville, N.Y., assignor to Symington Wayne Corporation, Salisbury, Md., a corporation of Maryland
Filed May 20, 1960, Ser. No. 30,674
8 Claims. (Cl. 105—221)

This invention relates to pedestal type side frames for railway trucks.

Designed for use with separate journal bearing assemblies, pedestal type side frames still find use in mounting separate journal boxes. However, their most important use at the present is in mounting roller and other cartridge bearings. In mounting such cartridge bearings, it is the present practice to lock the bearing against or for limited relative movement transversely of the side frame by an interposed saddle. For limiting relative vertical movement of the bearing and side frame, reliance is placed on a key fitting in a slot in and bolted to the jaw on the side frame at the inner side of the bearing opening and instanding therefrom beneath a side of the bearing. While the saddle has performed effectively in service, the retainer key has proved inadequate to prevent disassembly of the truck components in a number of derailments with consequent instability and potential and, in some cases, actual damage to its underframe by loose wheel and axle assemblies.

The primary object of the present invention is to provide an improved pedestal type side frame whereby a cartridge bearing or other bearing assembly contained between jaws of the side frame is positively locked against accidental disassembly.

Another object of the invention is to provide in a cartridge bearing railway truck, a pedestal type side frame having means fittable with by minor modification to the side frame for positively retaining a bearing against accidental disassembly from the side frame.

An additional object of the invention is to provide in a cartridge bearing railway truck a pedestal type side frame having a retainer straddling the bottom of a bearing-receiving opening therein and releasably connected to the legs at both sides of the opening, the connection of the retainer to one of the legs being such as to lock the retainer against accidental disconnection from either leg.

Other objects and advantages of the invention will appear hereinafter in the detailed description, be particularly pointed out in the appended claims and be illustrated in the accompanying drawings, in which:

Figure 1:
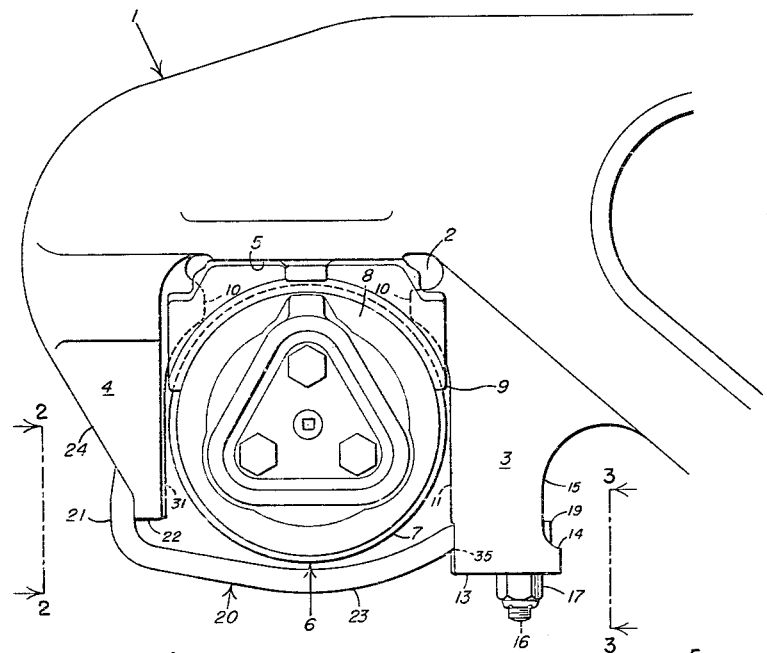
FIGURE 1 is a fragmentary side elevational view of a cartridge bearing railway truck incorporating a preferred embodiment of the pedestal type side frame of the present invention.

Referring now in detail to the drawings in which like reference characters designate like parts, the improved pedestal type side frame of the present invention, while usable with separate journal box or otherwise housed journal bearings or bearing assemblies, whether solid or roller, is particularly adapted for use with roller or solid cartridge journal bearings and, as exemplary of the invention, has been illustrated as part of a cartridge bearing railway truck.

In the main typical of side frames used in such trucks and having duplicate end portions, only one of which has been shown as sufficient for understanding of the invention, the pedestal type side frame 1 has at either end a downwardly opening journal bearing-receiving opening or jaw 2 bounded at the sides by vertically extending or depending inner and outer legs 3 and 4, respectively, and at the top by a horizontally disposed top wall 5. Insertible from below and seated in the opening 2 is a cartridge journal bearing 6 which may be either a roller or a solid bearing. In either case, the bearing will usually be a sealed cartridge, applicable and removable as such and having a generally cylindrical housing 7 closed at the front by a removable axle cap, cover or lid 8 which, depending on the type, will be bolted to the housing or to the end of the journal (not shown). As in the usual installation, the bearing 6 will be limited in or interlocked against relative movement transversely of the side frame 1 by a saddle or adapter 9, slidable over and ribbed to interfit with the housing 7 and flanged inboardly and outboardly to overlap corresponding sides either of the side frame about the opening 2 or of positioning lugs 10 instanding from upper portions of the legs 4 and 5 into that opening.

As in a conventional pedestal type side frame, one of the legs and preferably the inner jaw 3 is longer than and projects or extends below the outer leg 4 and has its inner or opening-confronting wall or web 11 interrupted by a slot or aperture 12 extending horizontally through the jaw adjacent its lower end or extremity 13. Ordinarily, this slot 12 would receive a retainer key which would be releasably attached to the shelf or bottom web or wall 14 of the inner leg 3 by a bolt insertible between the inboard and outboard flanges 15 of the leg and extending through aligned apertures in the key and shelf, the bolt carrying below the shelf a lock nut and having its head held against turning by lugs instanding from the flanges and partly defining the upper boundary of the slot. Such a bolt 16 extending through an aperture in the bottom shelf 14 and carrying therebelow a lock nut 17, the square head 18 of which is held against turning by spaced lugs 15a instanding from the inboard and outboard flanges 15 and partly defining the upper boundary of the slot 12, is the preferred locking means of this invention. However, instead of a retainer key, the element extending into the slot 12 and locked or anchored therein to the shelf 14 is an inner, substantially horizontally disposed leg 19 of a preferably flat retainer or retainer bar or strap 20. Straddling or extending across the opening 2 below the bearing 6, the preferred retainer bar 20 has an outer leg 21 unbent or upturned substantially normal or at right angles to the inner leg 19 and wrapped about or around the lower or bottom end 22 of the outer leg 4 and releasably attached or connected to that leg. Generally of L-shape and with one of its angularly related end legs releasably anchored or locked to one frame leg and its other frame leg releasably connected to the other jaw, the retainer bar, when anchored, as in the illustrated embodiment, in a conventionally positioned slot in a conventional inner frame leg, will have as its end leg-connecting intermediate portion, web, or leg 23, which straddles or closes the otherwise open lower end of the opening 2 between the frame legs, downwardly bowed, arched or bent to accommodate or clear the bearing 6 during as well as after insertion or sliding of its inner leg 19 into the slot 12.

Figure 2:
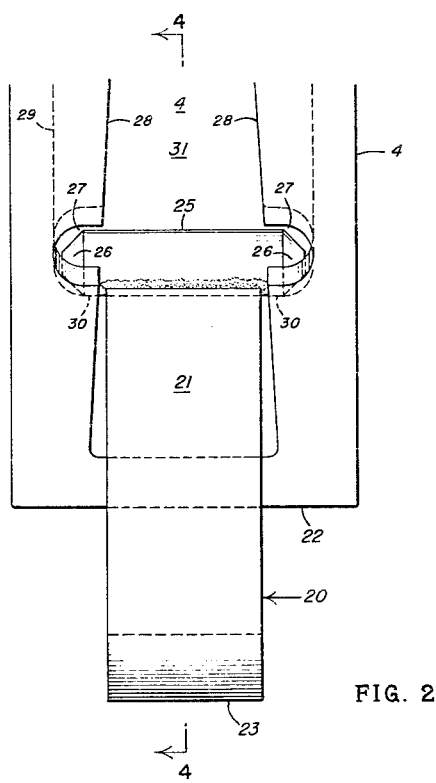
FIGURE 2 is a fragmentary end elevational view on an enlarged scale taken from lines 2—2 of FIGURE 1.
Figure 3:
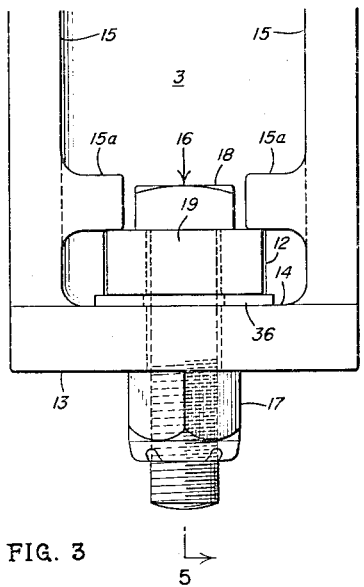
FIGURE 3 is a fragmentary end elevational view on an enlarged scale taken from lines 3—3 of FIGURE 1.
Figure 4:
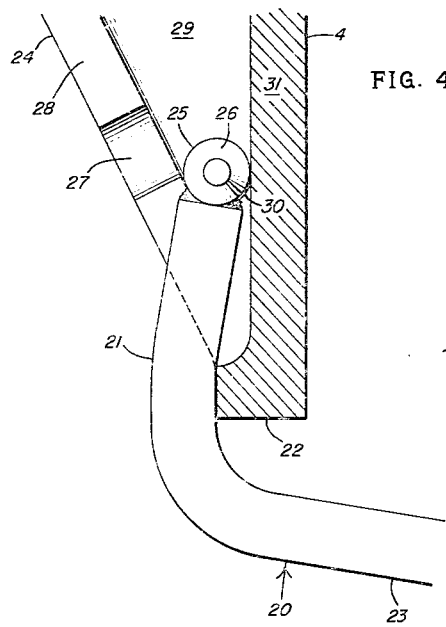
FIGURE 4 is a fragmentary vertical sectional view taken along lines 4—4 of FIGURE 2.
Figure 5:
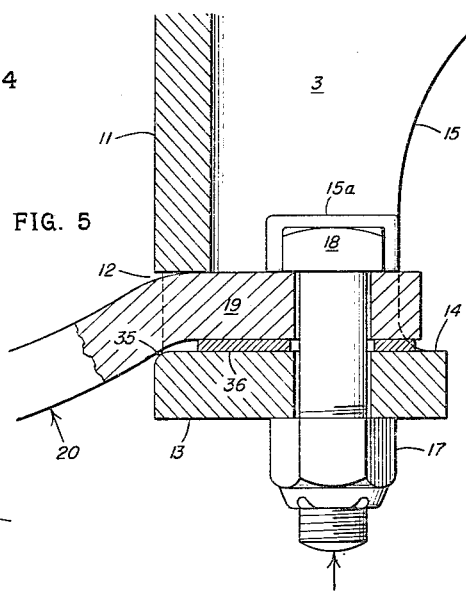
FIGURE 5 is a fragmentary vertical sectional view taken along lines 5—5 of FIGURE 3.
Figure 7:
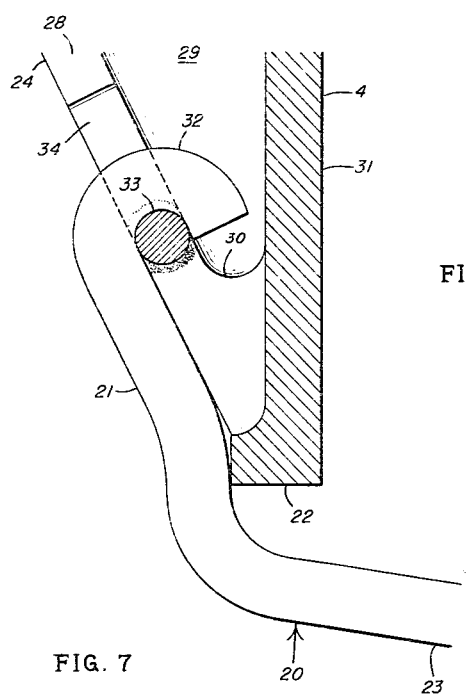
FIGURE 7 is a vertical sectional view taken along lines 7—7 of FIGURE 6.
Figure 6:
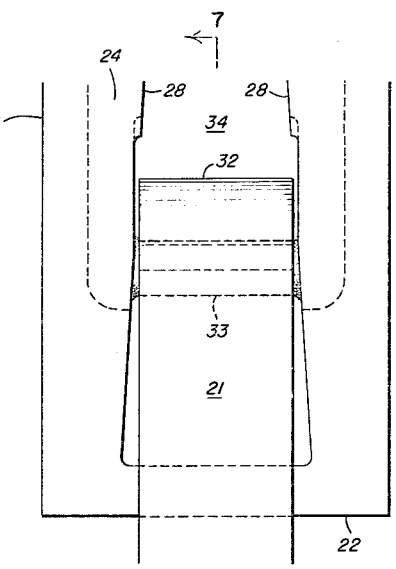
FIGURE 6 is a fragmentary elevational view corresponding to FIGURE 2 of another embodiment of the side frame of the present invention.

Designed to have its inner leg 19 partially slid or inserted into the slot 12 before attachment of its outer leg 21 to the outer frame leg 4, the retainer bar 20 has its outer leg removably attached to the outer side 24 of the outer frame leg, intermediate vertical ends or extremities of the latter, by an interconnection, interfit or inter-engagement, into position for which the outer leg is slidable on further sliding of the inner leg into the slot in the inner face; once established, this interconnection or interfit, by connecting the outer retainer leg against movement relative to the outer frame leg both downwardly and longitudinally of the side frame, itself will restrain or tend to prevent dislodgement of the retainer. However, for positively locking the retainer against displacement dependence is placed on the anchoring of the inner leg 19 to the inner jaw 3. Interconnections suitable for the purpose are exemplified by the two forms or embodiments illustrated in the drawings. In the form shown in FIGURES 2 and 4, the upbent outer leg 21 has or carries as or at its upper end a cross or transverse, preferably cylindrical connecting pin, rod, bar or head 25 welded or otherwise fixed to or made rigid with the retainer bar. The ends 26 of the preferred pin 25, beyond the sides of the retained bar, preferably are tapered so as to slide or be insertible through corresponding configured notches or apertures 27 cut in the transversely spaced reinforcing ribs or flanges 28 partly closing the usual core print opening 29 in the outer side 24 of the outer frame leg 4. Correspondingly, the retainer bar 20 or at least the upper portion of its outer leg 21 is of a width to be accommodated or passed between the ribs 28, thus enabling the cross pin 25 and the adjoining portion of the retainer bar to enter the core print opening 29 and the ends 26 of the pin, after passing through the notches 27, to drop down into seats 30 in sides of the opening at the junctures of the ribs and the inner web or wall 31 of the outer leg 4.

In the other illustrated form of interconnection between the outer frame leg 4 and outer leg 21 of the retainer bar, the outer bar leg has its upper end portion formed as an inturned hook 32. As in the case of the connecting element of the form of the embodiment of FIGURES 2 and 4, the cross pin 25, the hook 32, serving as the connecting element of this embodiment, is slidable into connecting or inter-engaging position with connecting means on, fixed to or carried by the outer frame leg 4 on further sliding of the inner leg 19, longitudinally of the side frame 1, into connecting or interlocking position in the slot 12 in the inner jaw 3. As well, the hook 32 is slid and in connecting position projects into the core print opening 29 in the outer side 24 of the outer frame leg 4. However, to suit the hook, the connecting means or catch on the outer frame leg is a rod or pin 33 extending transversely of the side frame 1 across the mouth or entrance 34 of the core print opening 29, conveniently between and connected or fixed to or rigid with the ribs 28 at the sides of the mouth.

In accordance with the preferred construction, the upbent outer leg 21 of each of the illustrated forms of the retainer bar 20, in its connection position in which it is suspended or hung from the outer frame leg 4, abuts against the outer side 24 of the outer frame leg 4 adjacent the lower end 22 of the latter so as, by engagement of the outer bar leg at a plurality of vertically spaced points with the outer side of the outer frame leg, to inhibit bending of the retainer bar by the bearing 6 under forces tending to disassemble the bearing from the side frame 1. Apart from the notching of the ribs 28 in the first embodiment and the fixing, as by welding, of the connecting rod 33 on which the hook 32 seats, to the ribs in the second embodiment, the minor modification required to adapt a conventional pedestal type side frame to take the retainer bar 20 is the bevelling or rounding of the inner corner or lip 35 of the shelf 14 at the entrance of the slot 12 in the inner frame leg 3. This bevelling in conjunction with the downward bowing of the intermediate web or leg 23 of the retainer bar 20 and the making of the bar as a whole or at least its inner leg 19 thinner than the vertical dimension of the slot 12, provides sufficient vertical clearance below the housing 7 and in the slot for installation of the bar. After the bar is installed, the vertical clearance between its intermediate leg 23 and the housing 7 and its inner leg 19 and the slot 12 can readily be reduced to a minimum by inserting a shim 36 between the inner leg and the underlying shelf 14 of the inner jaw 3, the shim being apertured to receive the bolt 16 or solid, depending on whether the inner leg is locked in connecting position to the inner frame leg by the preferred bolting or by welding.

From the above detailed description it will be apparent that there has been provided an improved pedestal type side frame having a retainer bar removably attached to the frame legs at either side of each of its bearing-receiving openings and effective through the bars in preventing accidental disassembly of the bearings under all conditions. It should be understood that the described and disclosed embodiments are merely exemplary of the invention and that all modifications are intended to be included that do not depart from the spirit of the invention or the scope of the appended claims.

Having described my invention, I claim:

1. In a pedestal type side frame having a downwardly opening bearing-receiving opening bounded at sides by downstanding inner and outer legs, the combination of a horizontally disposed slot in said inner leg adjacent a lower end thereof and opening inwardly onto said opening, horizontally directed seat means fixed to said outer leg at an outer side thereof and above a lower extremity of a bearing in said opening, a retainer bar extending across and closing said opening below and having an upwardly concave intermediate portion facing a bearing in said opening, said retainer bar beyond said portion having a horizontally disposed inner leg slidable into said slot and a hooked outer leg engageable with said seat means on sliding of said bar longitudinally and said outer leg downwardly of said frame for supporting said bar on said frame for restraining relative movement therebetween, and a vertically directed bolt for locking said inner bar leg in said slot and thereby positively locking said hooked end in engagement with said seat means.

2. In a pedestal type side frame having a downwardly opening bearing-receiving opening bounded at sides by vertically extending inner and outer legs, the combination of a horizontally disposed slot in the inner of said legs adjacent a lower end thereof and opening inwardly onto said opening, support means carried by the outer leg intermediate ends thereof and above a lower extremity of a journal bearing received in said opening, a retainer bar having an intermediate portion extending across and closing said opening below a bearing therein, inner and outer legs on said bar at opposite end portions thereof slidable respectively into said slot and into an interfit with said support means on sliding of said bar longitudinally and said outer leg thereof downwardly of said frame for supporting said bar on said frame legs and restraining relative movement therebetween, and means for locking an inner of said legs of said bar in said slot and thereby positively locking said bar in supported position.

3. In a pedestal type side frame having a downwardly opening bearing-receiving opening bounded at sides by vertically extending inner and outer legs, the combination of a horizontally disposed slot in an inner of said legs adjacent a lower end thereof and opening inwardly onto said opening intermediate vertical extremities of a bearing therein, connecting means fixed to the other leg intermediate ends and above a lower extremity of said bearing, a retainer bar extending across and closing said opening below and having a downwardly bowed intermediate bearing, said retainer bar beyond said portion having angularly related inner and outer legs slidable respectively into said slot and into an interfit with said connecting means on sliding of said bar longitudinally and said legs thereof downwardly of said frame for supporting said bar on and restaining movement thereof relative to said legs of said frame, and means for locking said inner bar leg in said slot and thereby positively locking said bar to said frame legs.

4. In a pedestal type side frame having a downwardly opening bearing-receiving opening bounded at sides by vertically extending inner and outer legs, the combination of a horizontally disposed slot in an inner of said legs adjacent a lower end thereof and opening inwardly onto said opening above a lower extremity of a bearing therein, connecting means carried by the other leg intermediate ends thereof and above said lower extremity, a retainer bar extending across and closing said opening below and having an upwardly concave intermediate portion facing said bearing, said retainer bar beyond said portion having a horizontally disposed inner leg and an outer leg angularly related thereto slidable respectively into said slot and into an interfit with said connecting means on sliding of said bar longitudinally and said outer leg thereof downwardly of said frame for supporting said bar on and restraining movement thereof relative to said legs of said frame, and vertically directed bolt means for locking one of said bar legs in said slot and thereby positively locking said bar to said frame legs.

5. In a pedestal type side frame having a downwardly opening bearing-receiving opening bounded at sides by downstanding inner and outer legs, the combination of a horizontally disposed slot in said inner leg above a bottom shelf thereof and opening inwardly toward said opening, seats in and accessible through notches in ribs at sides of an entrance to a core print opening in an outer side of said outer leg, said seats being positioned above a lower extremity of a bearing in said bearing-receiving opening, a retainer bar extending across and closing said bearing-receiving opening below and having a downwardly bowed intermediate portion facing said bearing therein, said retainer bar having a horizontally disposed inner leg and an upstanding outer leg, said inner bar leg being slidable into said slot on sliding of said retainer bar longitudinally of said side frame, a transverse pin fixed to an upper end of said outer bar leg and slidable through said notched ribs into said seats on sliding of said inner leg into said slot for connecting said outer legs and restraining relative movement therebetween, a shim interposed between said inner leg and shelf, and a bolt extending vertically through said inner bar leg, shim and shelf for locking said inner bar leg to said inner frame leg and thereby positively locking said pin in said seat.

6. In a pedestal type side frame having a downwardly opening bearing-receiving opening bounded at sides by downstanding inner and outer legs, the combination of a horizontally disposed slot in said inner leg above a bottom shelf thereof and opening inwardly toward said opening, a horizontally directed connecting rod fixed to ribs at sides of and extending across an entrance to a core print opening in an outer side of said outer leg, said rod being disposed above a lower extremity of a bearing in said bearing-receiving opening, a retainer bar extending across and closing said bearing-receiving opening below said bearing therein, said retainer bar having a horizontally disposed inner leg and an upstanding outer leg, said inner bar leg being slidable into said slot on sliding of said retainer bar longitudinally of said side frame, an inturned hook at an upper end of said outer bar leg and slidable into engagement with said connecting rod on sliding of said inner bar leg into said slot for connecting said outer legs and restraining relative movement therebetween, a shim interposed between said inner bar leg and shelf, and a bolt extending vertically through said inner bar leg, shim and shelf for locking said inner bar leg to said inner frame leg and thereby positively locking said hook in engagement with said rod.

7. In a pedestal type side frame having a downwardly opening bearing-receiving opening bounded at sides by downstanding inner and outer legs, the combination of a horizontally disposed slot in said inner leg adjacent a lower end thereof and opening inwardly onto said opening, connecting means carried by said outer leg at an outer side thereof above a lower extremity of a bearing in said bearing-receiving opening, a retainer bar extending across and closing said opening below said bearing therein, said retainer bar having a horizontally disposed inner leg slidable into said slot on sliding of said bar longitudinally of said side frame, an upstanding outer leg on said bar carrying connecting means and slidable into position to connect said last-named to said first-named connecting means and restraining relative movement therebetween on sliding of said inner bar leg into said slot for connection of said outer bar leg to said outer frame leg, said outer bar leg in connected position abutting against said outer side of said outer jaw below the connecting means carried thereby, shim means interposed between said inner bar leg and a bottom wall of said slot, and bolt means extending vertically through said inner bar leg, shim means and bottom wall for positively locking said inner bar leg in said slot and thereby locking said connecting means on said outer bar and frame legs to each other.

8. In a pedestal type side frame having a downwardly opening bearing-receiving opening bounded at sides by downstanding inner and outer legs, the combination of a horizontally disposed slot in said inner leg adjacent a lower end thereof and opening inwardly onto said opening, connecting means carried by said outer leg at an outer side thereof and above a lower extremity of a bearing in said opening, a retainer bar extending across and closing said opening below a bearing therein, said retainer bar having a horizontally disposed inner leg slidable into said slot on sliding of said bar longitudinally of said side frame, an upstanding outer leg on said bar carrying connecting means and slidable into position to connect said last-named to said first-named connecting means and restrain relative movement therebetween on sliding of said inner bar leg into said slot for connection of said outer bar leg to said outer frame leg, said outer bar leg in connected position abutting against said outer side of said outer frame leg below the connecting means carried thereby, said retainer bar being downwardly bowed intermediate its legs and said bottom wall having a bevelled inner corner for enabling said bar to be slid into position to close said bearing-receiving opening, shim means interposed between said inner bar leg and a bottom wall of said slot, and bolt means extending vertically through said inner bar leg, shim means and bottom wall for locking said inner leg in said slot and thereby positively locking said connecting means on said outer bar and frame legs to each other.

References Cited in the file of this patent
UNITED STATES PATENTS

| | | |
|---|---|---|
| 773,564 | Green | Nov. 1, 1904 |
| 1,157,877 | Lamont | Oct. 26, 1915 |
| 2,234,413 | Orr | Mar. 11, 1941 |
| 2,424,327 | Nystrom et al. | July 22, 1947 |
| 2,719,491 | Erzer | Oct. 4, 1955 |